United States Patent
Piper et al.

[19]

[11] Patent Number: 5,908,519
[45] Date of Patent: *Jun. 1, 1999

[54] HOLLOW CORE IN-LINE SKATE WHEEL HAVING CONTOUR CONFORMING POLYURETHANE WALL

[75] Inventors: Neal Piper; Tom Peterson, both of Huntington Beach, Calif.

[73] Assignee: The Hyper Corporation, Santa Ana, Calif.

[*] Notice: This patent is subject to a terminal disclaimer.

[21] Appl. No.: 08/680,728

[22] Filed: Jul. 12, 1996

Related U.S. Application Data

[63] Continuation-in-part of application No. 08/595,844, Feb. 2, 1996, Pat. No. 5,641,365, which is a continuation-in-part of application No. 08/354,374, Dec. 12, 1994, Pat. No. 5,630,891.

[51] Int. Cl.⁶ .................................................. A63C 17/22
[52] U.S. Cl. .................... 152/165; 152/327; 152/452; 152/511; 152/DIG. 18; 301/5.3
[58] Field of Search .......................... 152/DIG. 18, 511, 152/512, 514, 515, 165, 327, 384, 166, 325, 320, 322, 501; 280/11.22, 11.23; 301/5.3

[56] References Cited

U.S. PATENT DOCUMENTS

| | | |
|---|---|---|
| 330,630 | 11/1885 | Smith . |
| 988,533 | 4/1911 | Zverina . |
| 1,244,209 | 10/1917 | Hickman . |
| 1,817,356 | 8/1931 | Fisher . |
| 2,052,130 | 8/1936 | Cassady ................................. 152/165 |
| 2,073,708 | 3/1937 | Parrish . |
| 2,262,714 | 11/1941 | Ware . |
| 2,324,974 | 7/1943 | Greenup ................................. 152/511 |
| 3,877,710 | 4/1975 | Nyitrai . |
| 4,031,937 | 6/1977 | Georgia et al. . |
| 4,183,156 | 1/1980 | Rudy . |
| 4,287,250 | 9/1981 | Rudy . |
| 4,310,042 | 1/1982 | Wyman . |
| 4,379,104 | 4/1983 | Koorevaar . |
| 4,387,071 | 6/1983 | Kirkhuff . |
| 4,541,643 | 9/1985 | Pavinic ................................. 280/11.25 |
| 5,129,709 | 7/1992 | Klamer . |
| 5,144,708 | 9/1992 | Pekar . |
| 5,310,250 | 5/1994 | Gonsior . |
| 5,312,844 | 5/1994 | Gonsior et al. . |
| 5,320,418 | 6/1994 | Chen . |
| 5,346,231 | 9/1994 | Ho . |
| 5,630,891 | 5/1997 | Peterson et al. ........................ 152/165 |
| 5,632,829 | 5/1997 | Peterson et al. ........................ 152/165 |

FOREIGN PATENT DOCUMENTS

| 96/34666 | 11/1996 | WIPO ................................. 152/165 |

Primary Examiner—Geoffrey L. Knable
Attorney, Agent, or Firm—Fulwider Patton Lee & Utecht, LLP

[57] ABSTRACT

A skate wheel including a hard urethane hub formed with a drop center between radially projecting guide flanges, and including stand-off ribs disposed in equidistant spaced relation thereabout. Pairs of centering fins are spaced axially along a number of stand-off ribs thereby forming a central groove along the drop center. An annular bladder with an interior annular stand-off skirt is nested within the centering fins and concentric with the drop center. The wheel body is formed of a soft polyurethane and surrounds the drop center and encapsulates the annular tube, thereby forming a contoured surface. A method of manufacturing the wheel that includes selecting a welded seam annular tube, pre-pressurize it and then further pressurize it through the exothermic reaction by pouring liquid urethane in a mold to form the tire.

18 Claims, 4 Drawing Sheets

HOLLOW CORE IN-LINE SKATE WHEEL HAVING CONTOUR CONFORMING POLYURETHANE WALL

This application is a continuation-in-part of U.S. application, Ser. No. 08/595,844, filed Feb. 2, 1996, now U.S. Pat. No. 5,641,365, which was in turn a continuation-in-part of U.S. application, Ser. No. 08/354,374, filed Dec. 12, 1994, now U.S. Pat. No. 5,630,891.

BACKGROUND OF THE INVENTION

1. Field of the Invention

This invention relates to in-line roller skate wheels and more particularly to a pre-pressurized pneumatic skate wheel of integral polyurethane construction having contour conforming tire support wall.

2. Description of the Prior Art

Roller skates and roller skate wheels have been known in the art. Typically, roller skates have incorporated four wheels in each skate. Early wheels were constructed of either wood or metal depending on the intended use. Wood wheels were most often used for indoor roller rink skating while metal wheels were used for outdoor skating. Inflatable roller skate wheels, such as that disclosed in U.S. Pat. No. 988,533 to Zverina, provided a simple, durable and economic roller skate wheel. Zverina includes an inflatable tube encased in a conventional tire.

In the past, many skate wheels were constructed of rubber. The availability of polyurethane in skate wheel construction has enhanced the enjoyment and popularity of outdoor skating. Typically roller skates have been constructed with four wheels in a box-like configuration. Such skates, while functional, do not allow for the freedom of movement experienced by ice skaters. It was thus proposed to mount the roller skate wheels in a line along the skate frame to achieve mobility which closely mimicked the movement of an ice skate. Since that time, "in-line roller skates" have become one of the most popular recreational and physical fitness activities in the United States, and elsewhere. In-line skating has also developed into a highly sophisticated and technologically advancing commercial market.

The recreational skater often travels a variety of terrains ranging from concrete and wood to more bumpy and uneven surfaces such as asphalt which may exhibit bumps, pits and even wide cracks with vegetation growing therein. The main concern experienced by the recreational skater is to obtain a comfortable ride while skating socially, participating in physical fitness or even just a way to reach a destination. This skater requires a resilient wheel which is light weight and shock resistant. More experienced skaters, such as competitive skaters, employ in-line skates for sporting purposes such as hockey or road racing. Dancers typically prefer relatively hard tire bodies since some slippage is an acceptable compromise for the performance required. On the other hand, a hockey player would prefer a softer tire having excellent surface gripping characteristics. In the past, these various performance characteristics have been attained only by expensive painstaking manufacturing processes.

Polyurethane in-line skate wheels proposed in the past have typically been constructed by injection molding to form a hub surrounded by a tire body of solid urethane. It is desirable that such wheels provide a durable and relatively smooth ride over many types of terrains. Solid polyurethane bodies have been proposed. Such tire bodies are necessarily restricted in that the performance characteristics cannot be easily and inexpensively adjusted during the manufacturing process to accommodate the many different support surfaces and loads emanated by a skate employed in a demanding sport such as, for instance, hockey. Unlike a traditional quad or box-style roller skate, in-line skates are designed to withstand a variety of different side loads due to the inclination of the skate along its horizontal axis when turning, as well as high intensity shock loads from quick stops, bumps and other road hazards. Thus the designers of in-line skate wheels have an intensely difficult task when faced with such diverse performance requirements. One attempt to solve the shock absorption and performance problems can be found in the injection molded tire shown in U.S. Pat. No. 5,312,844 to Goniser. Goniser discloses a wheel incorporating a hard urethane hub and a softer, injection molded solid body polyether type polyurethane tire formed on the hub. Wheels of this type have not gained general acceptance in the in-line U.S. skate market. It is believed that the tire bodies in such wheels cannot be easily and inexpensively made to exhibit the characteristics demanded by users. The capital cost for each injection mold is considerable thus limiting the number of styles of tires that can be manufactured cost effectively with different operating characteristics.

Thus, there exists a need for a skate wheel which can be inexpensively casted from thermoset polyurethane by a method which allows for convenience adjustment of the tire body to exhibit different operating characteristics without the necessity of making entirely new molds or involving an expensive development procedure to develop new or different thermoplastic urethane. It has been discovered that soft polyurethane exhibits desirable characteristics for in-line skate wheels in that the outer peripheral tread surface tends to flex and compress in response to forces associated with rolling contact under load involving irregular support surfaces. However, solid thermoplastic polyurethane tire bodies suffer the shortcoming that they consume a substantial quantity of polyurethane and that the force absorption characteristics are not ideal. The performance factors with which an in-line skater is concerned for when skating over concrete, asphalt or a composition, are speed, grip, durability and shock absorption. While all four factors are important for active sports such as hockey, grip is critical to preventing slippage and minimizing abrasion and wear.

Therefore, it is desirable to provide an in-line skate wheel which combines the resiliency and performance of a polyurethane wheel with the enhanced grip, durability and shock absorption properties associated with hollow body wheel construction and which can be casted from thermo setting polyurethane. A solution proposed in our U.S. patent application Ser. No. 08/354,374 filed Dec. 12, 1994, now U.S. Pat. No. 5,630,891, assigned to the assignee of the instant application, sets forth an in-line skate wheel with an adjustable bladder encapsulated inside the polyurethane skate wheel. Pressure in the bladder is adjustable through the use of a valve system. Such a wheel allows the skater to adjust wheel performance to match his or her needs for the particular skating maneuver to be undertaken. Since the skater has multiple performance options available without purchasing multiple wheels and without having to manually change the skate wheels, such a wheel is versatile, cost effective and convenient. While having important commercial applications, it is recognized that such an adjustable pneumatic in-line skate wheel requires the skater to manipulate the wheel each time skate conditions change and the wheel itself is relatively costly to manufacture.

Another form of in-line skate wheel with similar urethane and pneumatic benefits can be found in our U.S. patent application Ser. No. 08/595,844 filed Feb. 2, 1996 now U.S.

Pat. No. 5,641,365, also assigned to the assignee of the instant application. In that application, we show a pre-pressurized pneumatic in-line skate wheel of integral construction and consisting of an annular bladder and a plurality of radially projecting bladder rods. Such an invention is relatively cost effective to manufacture but employs a relatively elaborate bladder and valve construction.

In other areas of the art, such as in the construction of variable pressure athletic shoes, it has been known to provide elastomeric bladders configured with multiple discrete chamber or open cell elastomeric foam having inlet and outlet valves. Devices of this type are shown in U.S. Pat. Nos. 4,183,156 and 4,287,250 to Rudy and U.S. Pat. No. 5,144,708 to Pekar. However, such bladders have not been generally adapted to or employed in skate wheel construction.

Thus there exists a need for an inexpensive in-line skate wheel configured with a polyurethane weight bearing tire wall securely bonded to a rigid hub and configured with a hollow annular cavity to thus minimize the volume of polyurethane required for the tire body and enhance the conformance of the tire to the underlying support surface. It is important that such a wheel be inexpensive to manufacture in a number of different tire hardness and adapted for operation on a number of different surfaces and under different operating conditions.

As can be seen, there remains a need for an in-line skate wheel which combines the benefits of the shock absorptive properties found in pneumatics with the resiliency of polyurethane, but in a manner that is easier and more cost effective to manufacture.

SUMMARY OF THE INVENTION

The invention is a pre-pressurized pneumatic in-line skate wheel with conforming contoured support surface to enhance gripping and reduce abrasion and which will also allow the skater to experience a resilient yet smooth ride. The present invention allows for more cost effective manufacturing process and thereby a cost effective alternative wheel that functions well on a variety of surfaces, and under a variety of conditions. Furthermore, the wheel construction is such that the bladder can further inflate during the manufacturing process thereby providing for proper bladder placement within the body of the tire and a more uniform bladder surface, and therefore a more even load bearing wheel.

The wheel includes a hard urethane hub formed with radially outwardly projecting stand-off ribs formed at their radial distal apexes with axial fins which are configured to form a shallow drop center. A low pressure annular bladder device surrounds the hub drop center to act as an annular cavity envelope during the manufacturing process. The hub ribs, fins drop center and poured polyurethane tire serve to generally position and encapsulate the bladder envelope and provide the load bearing and force cushioning structure.

The bladder may be formed with a stand-off skirt to maintain radial spacing about the drop center and may be inflated to assume a firm envelope defining a mandril about which the tire body is formed to thus cooperate in creating a tire which is relatively lightweight and affords consistent performance. The pre-pressurized bladder cooperates to encapsulate a small volume of pressurization gas which will respond to the heat generated by the exothermic reaction of the curing polyurethane in the tire to form an accurately located cavity about which a symmetrical thick wall of polyurethane is formed encapsulating such cavity to cooperate in carrying the wheel load and cushion against shock forces.

In one embodiment the annular bladder incorporates a radially inner stand-off skirt which contacts the hub drop center to cooperate in positively establishing the position of the body of the bladder within the mold during the manufacturing process.

Other features and advantages of the invention will become apparent from the following detailed description, taken in conjunction with the accompanying drawings, which illustrate, by way of example, the features of the invention.

DETAILED DESCRIPTION OF A PREFERRED EMBODIMENT

Figure 1:
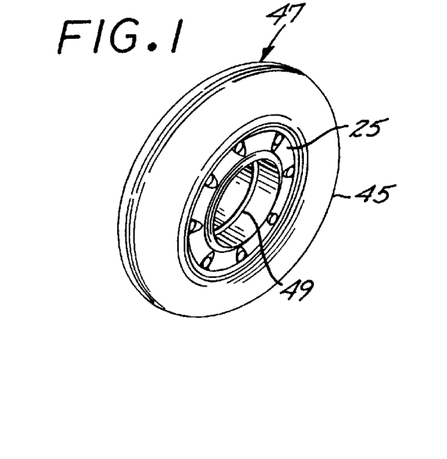
FIG. 1 is a perspective view of a in-line skate wheel embodying the present invention.
Figure 2:
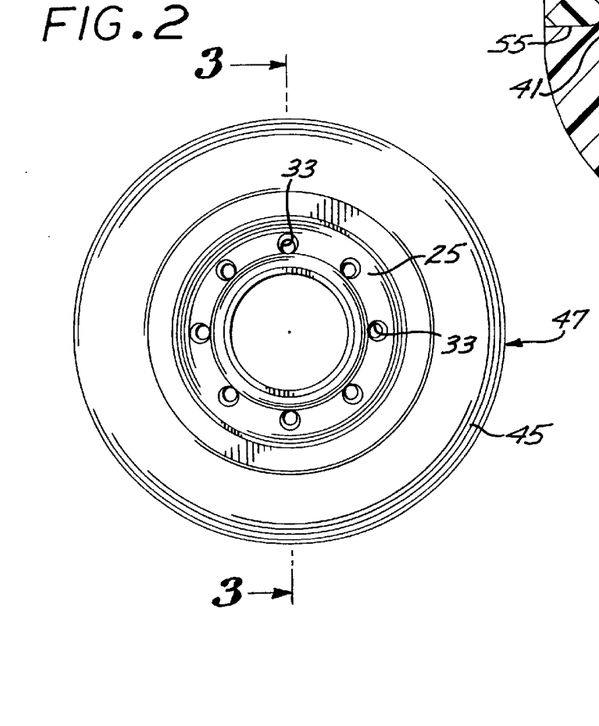
FIG. 2 is a side view, in enlarged scale, of the wheel shown in FIG. 1.
Figure 3:
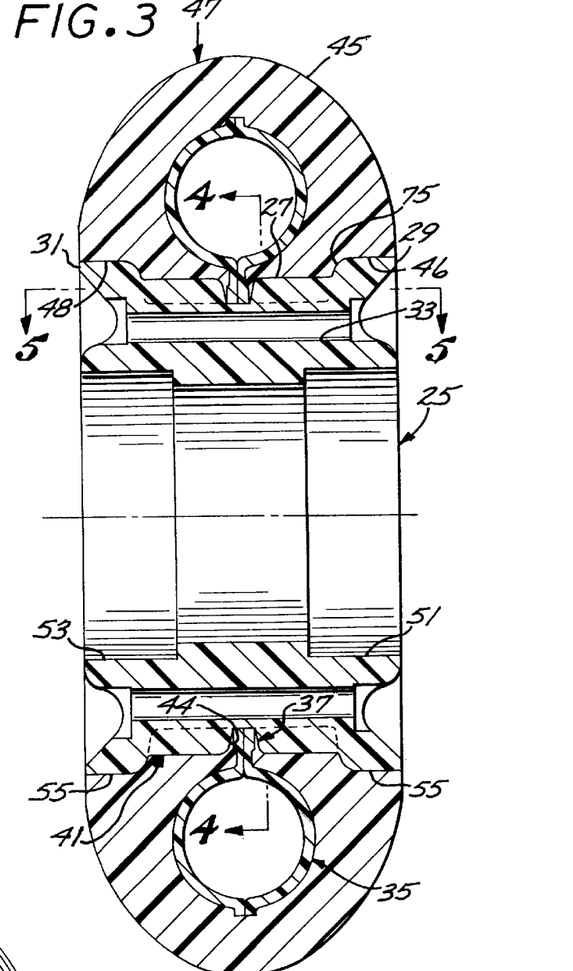
FIG. 3 is an enlarged cross-sectional view taken along line 3—3 of FIG. 2.
Figure 6:
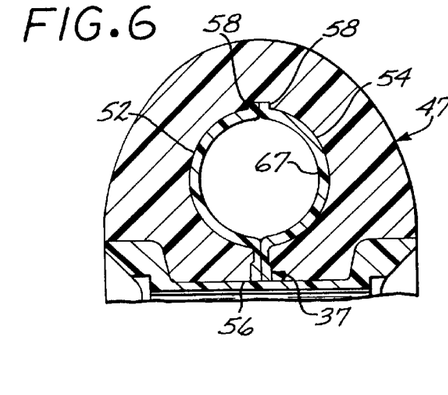
FIG. 6 is an enlarged cross-sectional view taken along line 6—6 of FIG. 3.

Referring to FIGS. 1 and 3, the hollow in-line roller skate wheel with conforming contoured support of the present invention includes, generally, a hard polyurethane hub 25 formed with a radially outwardly facing hub surface defining a hub wall and a drop center 27 having a pair of radial flanges 29 and 31. Conveniently, the flanges are formed with through axial curing bores 33 spaced equidistant around the opening in the hub. A thin wall bladder device 35 is constructed of co-extensive donut shaped urethane sheets fused by radio frequency (R.F.) energy about the radially interior and exterior peripheries to form a body defining an annular cavity 67 and leaving a double layer, radially inwardly projecting, stand-off skirt, generally designated 37 (FIGS. 3 and 6). The drop center may be formed with radial stand-off ribs 39 disposed in annular relation therearound.

Alternate ones of these stand-off ribs may be formed at the radial outer apexes thereof with axial fins 41 projecting radially outwardly and formed centrally with radially outwardly opening axially centered slots 44 configured to define annular groove segments into which the stand-off skirt 37 of the bladder device 35 is nested. A relatively soft, but load bearing polyurethane tire body 45, is formed around and generally encapsulates the bladder device 35 and is bonded thereto and to the surface of the drop center 27. The tire is configured with a thick wall defining a generally arch shape in transverse cross-section terminating at the opposite flat radially inner edges defining beads 46 and 48 and further defining a generally oval shaped, outwardly facing peripheral tread surface 47.

In-line skaters, recreational, advanced and even professionals, put great demands and stress on the design and construction of the in-line roller skate wheel. Even during recreational outings, the change in surfaces from rough to smooth and from irregular to even surfaces puts tremendous stresses or the skater as well as the skate wheels themselves. Further, sharp turns, quick stops and other such maneuvers subject the wheels to substantial shock loads and lateral torque loads to all sides of the tire body. When a skater is traveling at high speeds, the wheels are further subjected to vibrational stresses on top of the stress due to maneuvers and changing terrain. Therefore, it is critical that the in-line skate wheel be constructed to absorb shock in the tire body thereby reducing stress on the skater, plus create a resilient and reliable wheel. For many athletic events, such as in-line roller hockey, it is important that the tire form a flat tangential footprint of limited area at the contact plane with the support surface to thus enhance gripping to such support surface and thereby reduce abrasion which might otherwise result from slippage due to high centrifugal forces applied during sharp turns and quick maneuvers. In the present invention this is accomplished in a more cost efficient manner.

In the preferred embodiment the wheel is constructed of a hard polyurethane hub 25, with the annular bladder 35 and tire 45 constructed of relatively soft thermoset polyurethane. The hub 25 is constructed with a cylindrically shaped core defining a central axial bore, generally designated 49, having at its opposite ends enlarged-in-diameter to form oppositely opening, cylindrical bearing glands 51 and 53 configured to receive roller bearing assemblies. The hub is formed on the axially opposite sides of the drop center with the axially spaced apart radially projecting flanges 29 and 31 defining respective radially outwardly facing bead seats 55 (FIG. 3) onto which the respective annular tire wall edges 46 and 48 seat and which cooperate in carrying load forces applied to the wheel, hub and axial system. Formed about the drop center 27, in one embodiment, are somewhat saw tooth angular stand-off ribs 39 (FIG. 4) defining spokes radiating outwardly from such drop center to form radially outwardly facing contact surfaces to contact the bladder and assist in centering the bladder relative to the axial bore and enhance bonding of the hub and bladder assembly to the tire by providing axial flow paths therebetween into which the tire polyurethane lows during manufacture to form axial bridges and afford increased surface area between the hub and tire for positive bonding during the molding process. The stand-off ribs 39 are further formed at their radially distal apexes with the radially outwardly projecting fins 41 configured with the radially outwardly opening centering slots 44 arranged in a circular pattern to cooperate in defining annular, radially outwardly opening groove segments.

It will be appreciated that the hub is integrally formed of a single piece of hard polyurethane, typically with a durometer index of 70D, to provide the necessary support to ensure high degree of bonding strength during the tire molding process. A preferred embodiment of the present invention utilizes a 30% fiberglass filled thermoplastic polyurethane (TPU) available from BF Goodrich, Product No. 59300. The urethane materials forming the hub and tire will form a bond during the molding process to form an integral unit having exceptional durability.

In practice, the major diameter for the bead seats 55 of the hub 25 is about 3.9 cm, the major diameter of the ribs 39 about 3.3 cm, the major diameter for the respective fins 43 about 3.6 cm, the axial width of the hub is 2.4 cm, the axial width between the bead seats is 1.5 cm and the axial width of the bead seats 55 is 0.4 cm.

Figures 5, 7:
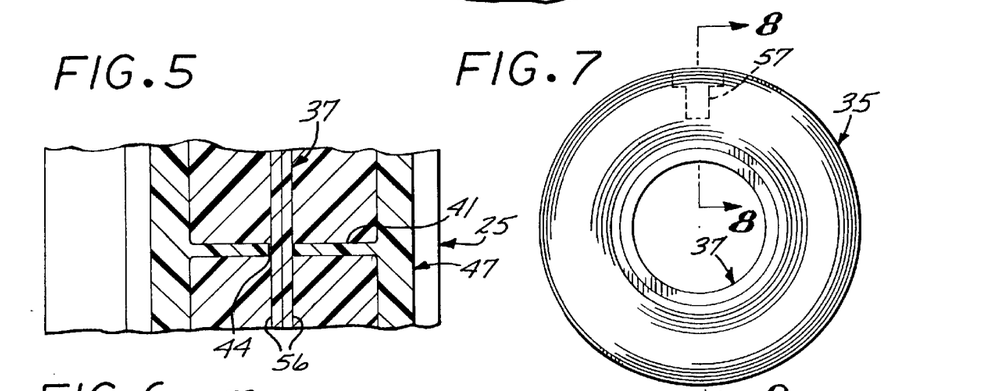
FIG. 5 is an enlarged cross-sectional view taken along line 5—5 of FIG. 3.
FIG. 7 is a side view, in reduced scale, of a pre-pressurized bladder device included in the wheel shown in FIG. 1.

Referring to FIG. 7, the bladder 35 is constructed of soft urethane ring shaped sheets 52 and 54 preferably of J. P. Stevens No. 1450 urethane of between 0.005 and 0.100 inches thick, preferably of 0.020 inches thick. The ring shaped sheets are welded together by heat sealing along their respective radially inner and outer marginal flanges 56 and 58 with the combined double layer of such inner flanges 56 serving to provide sufficient radial column strength to maintain the body of such bladder spaced radially from the drop center during the molding process as described hereafter. The durometer index of the bladder is approximately 80A. It is of benefit that the welded seams defined by the fused annular flanges 56 and 58 serve to establish essentially non-distendable inner and outer rings which fix the radially inner and outer dimensions of the bladder, irrespective of the increased pressure generated in the cavity of the body due to the elevated temperature acting on the air in such bladder during the exothermic reaction initiated by the introduction of the high temperature polyurethane for the tire body.

For the bladder 35, the outside diameter may be about 6.3 cm, the inside diameter of the skirt 37 about 2.8 cm, the outside diameter of such skirt about 3.2 cm and the outside diameter of the distended cross section of such bladder about 1.0 cm.

Formed in such bladder 35 is an one way check or "duck bill" valve generally designated 57. The duck bill valve 57 is used to provide one way gas or liquid flow into the bladder. The duck bill valve is constructed such that it extends radially into the annular bladder in a generally T-shape.

While the valve 57 may take many different forms, for the purpose of explanation, such valve is shown extending within the inflatable bladder 35 through the peripheral seal 73. Such valve may be constructed of two layers of heat sealable plastic film sealed along the side edges, so as to define a central channel 63. The central channel provides for the fluid flow from a pump external to the bladder. The valve may be of an outer layer of polyurethane ranging in thickness of 0.002 to 0.020 cm, and an inner layer of 0.0004 to 0.0006 cm thick polyurethane. The channel is not sealed but remains "open" along the perimeter. The unsealed area maintains the pressure with the bladder by the addition of a barrier coating to the inner surfaces of the valve. The barrier material may be of sufficient area and thickness to prevent heat or R.F. sealing of the valve when the bladder is being sealed. A barrier coating may be applied using printing techniques or through liquid dispersion techniques to adhere to the polyurethane to thereby prevent heat sealing of the two films.

In practice, the bladder is inflated by insertion of a pump device, typically using a needle, into the valve 57, through the channel 63. Pressurized fluid, such as air, is pumped into the bladder, through the valve, to partially inflate such bladder, thereby creating a soft, slightly distended ring shape. The bladder may then be placed over one flange 29 and nested in the drop center 27 ready for application of the tire body.

Figure 8:
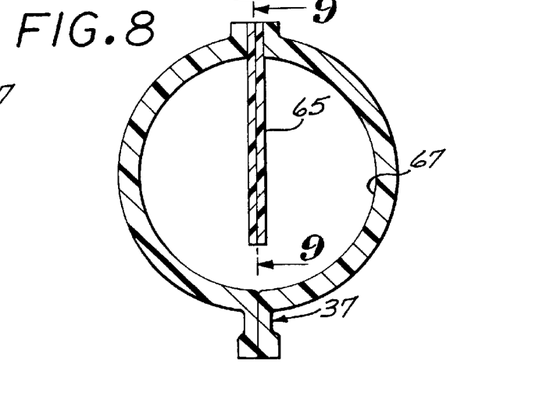
FIG. 8 is an enlarged cross-sectional view taken along line 8—8 of FIG. 7.

As noted, the annular bladder 35 is generally inflated with selected ones of various gases, liquids or mixtures thereof. The variation in gas pressure in the chamber 67 FIGS. 6 and 8 can be utilized to effectively control the resultant cross-sectional size and configuration of the bladder following the molding process and thus to achieve the proper tire body conformance. The exothermic reaction which occurs in the molding process typically generates heat at about 250° F. which may be employed to heat positive coefficient of expansion gas so as to elevate the pressure thereof to cause the bladder to assume a circular in cross-section shape. Utilizing the reaction governed by the Ideal Gas Law (PV=nRT), the relationship of volume and pressure can be utilized to control expansion of the annular bladder 35 during the exothermically driven temperature increase. Therefore, by utilizing various ones of positive coefficient of expansion gases such as Carbon Dioxide, Helium, Neon, CFC based gasses or ambient air, relatively great pressure increases in the annular bladder can be easily generated.

It will be appreciated that for higher pressures in the bladder, the degree to which the gas tends to permeate the bladder and tire walls becomes critical. Consequently, for application where higher pressures are required to afford the desired operating characteristics, gases with higher atomic numbers will be selected for their lower permeability characteristics. Many of those characteristics are described in U.S. Pat. No. 4,183,156 to Rudy so will not be set forth herewith in detail.

During the manufacturing process, the annular bladder 35 is typically pre-pressurized at ambient temperature, generally about 75° F. In the exemplary embodiment, the annular bladder is pressurized to a relatively low pressure, such as 10 psi. As can be seen in FIG. 3, the pre-pressurized annular tube 35 is then drawn over one of the flanges 29 and 31 and nested in the drop center 27. The stand-off skirt 37 is nested in the slots 44 formed in the respective fins 41 for precision and support.

Figure 13:
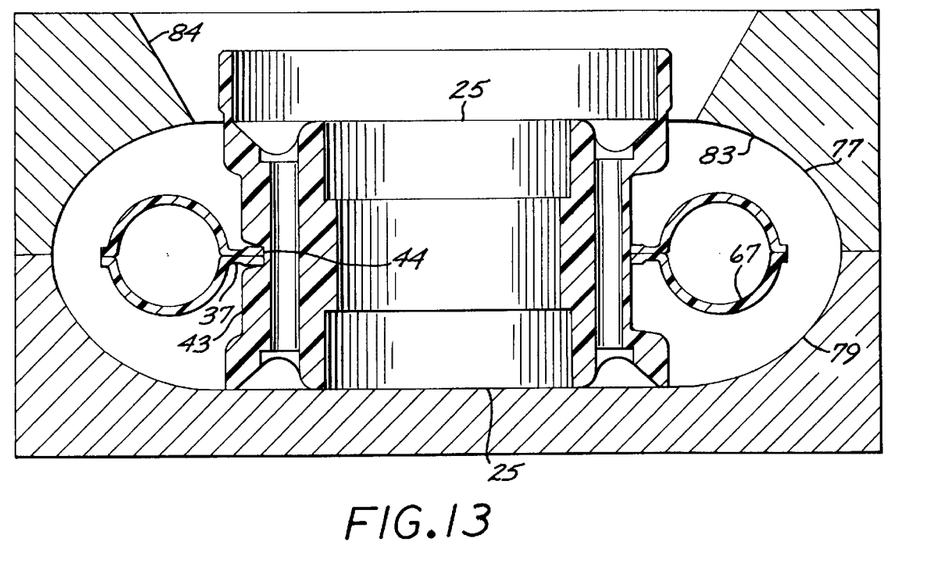
FIG. 13 is a cross-sectional view, in enlarged scale, of the hub and bladder device included in the wheel shown in FIG. 1 as nested in a mold.

It is a characteristic of the wheel of the present invention in that it can be manufactured by open cast mold construction (FIGS. 13 and 14) employing a mold having upper and lower halves. The mold halves are formed with complementary toroidal cavities 77 and 79 which may be placed together in a horizontal orientation with the upper half incorporating a funnel shaped gate 84. The hub 25 with the partially inflated bladder 35 mounted in the drop center may then be placed in position in the lower half of the mold and the upper half thereof closed thereon (FIG. 13). It will be appreciated that in practice, the weight of the body of the body of the bladder itself distended from the spacer skirt 37 may then weight the radially distal portion of such body slightly downwardly toward the bottom of the cavity in the lower mold half. Moreover, there may also be a tendency for the liquid polyurethane being poured into the body of the tire 45 to weight the body of such bladder downwardly in the mold cavity. This weighting of the bladder is then somewhat counteracted when the liquid polyurethane for the tire body is poured into the lower mold cavity 79 thus tending to buoy the inflated tube body upwardly. To compensate these factors, in practice, the centering notches 44 in the fins 41, may be spaced from the axial center of the drop center toward what would be the top side of the hub during the molding process such that, when the body of such bladder is weighted downwardly under its own weight and buoyed upwardly as described in the normal molding process, the body thereof will be centrally located and generally concentric with respect to the parabolically shaped tread surface of the tire when the molding process is completed.

Figure 4:
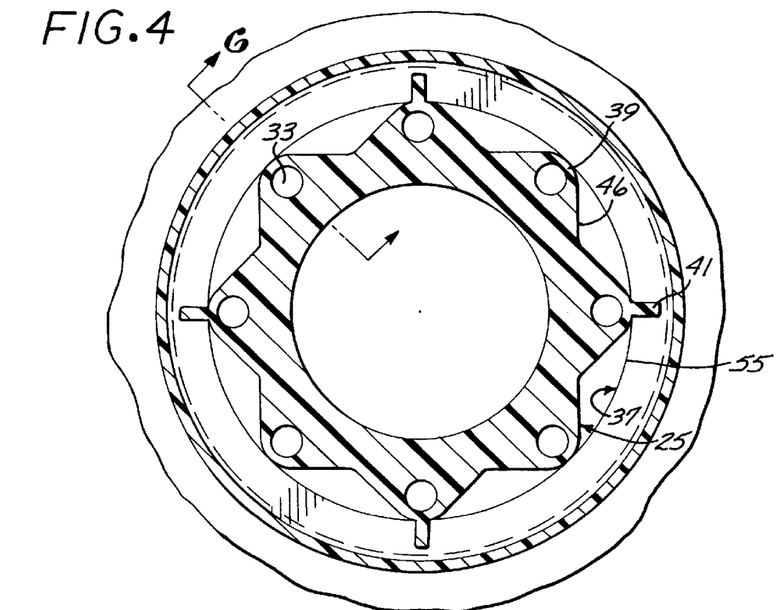
FIG. 4 is cross-sectional view, in enlarged scale, of hub and bladder device incorporated in the skate wheel taken along line 4—4 of FIG. 2.
Figure 14:
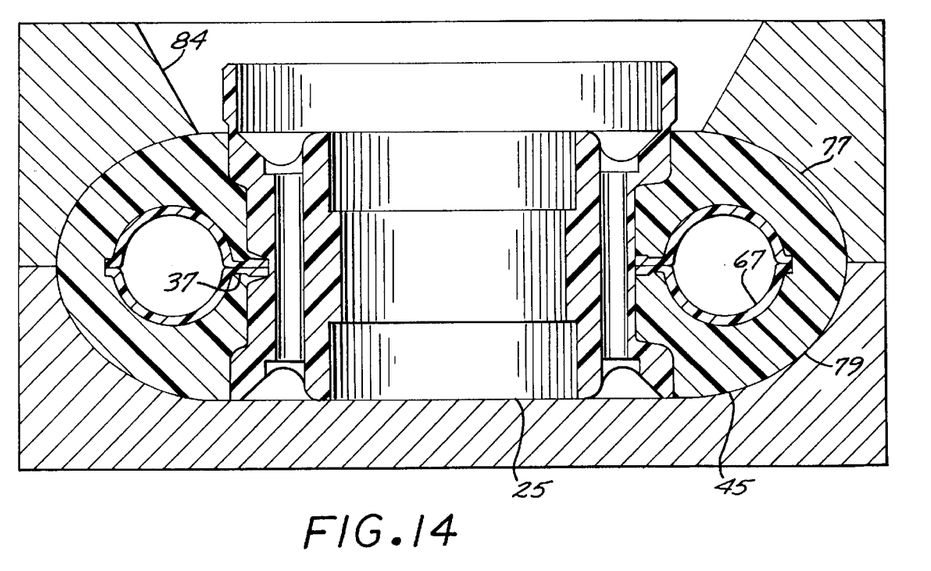
FIG. 14 is a cross-sectional view, similar to FIG. 13, but showing the tire body molded on the hub.

In any event, it will be appreciated that the liquid polyurethane for the body of the tire 45 will typically be poured into the mold gate 84 at a temperature of about 180° F. The molten polyurethane will flow about the cavity of the mold 83 and around the body of the partially inflated bladder 35 and around both sides of the stand-off skirt 37, through the axial passages 46 defined between the respective spacer ribs 39 to thereby form a relatively complete encapsulation of the bladder 35, including the formation of support bridges in the axial spacing 46 between the respective ribs (FIGS. 4 and 14). In this manner, the high integrity bond will be formed with the surface of the bladder 35 thus essentially forming such bladder integral with the body of the tire and also bonding with the surface of the drop center 27, including the undulating surfaces of the ribs 39 and the interface between the radially inwardly facing edges 46 and 48 of the opposite side walls of the tire as seated on radially outwardly facing seats 55 of the respective radial flanges 29 and 31 such that a relatively complete encapsulation of the cavity defined by the bladder 35 and complete bonding is achieved. The exothermic reaction of the molten polyurethane will serve to raise the temperature thus raising the temperature of the volume of air within the envelope defined by the bladder 35. As described above, for the relatively small volume of air trapped in the bladder 35 under the pre-pressurized pressure of 10 psi, this exothermic reaction for the volume of polyurethane captured in the mold cavity will raise the temperature of the entrapped air from about 75° F. to about 250° F. This then serves to expand the air in such bladder to fully distend the walls of such bladder under the dictates of the Ideal Gas Law (PV=nRT) causing axially opposite side walls of such bladder to be fully distended to force the axial cross section of such bladder to assume a circular configuration as depicted in FIGS. 3 and 14. During this process, it will be appreciated that the RF welded seams defined by the joinder of the radially internal and external flanges 56 and 58 (FIG. 6) will serve to limit the radially interior and radially exterior limits of the walls of the bladder from distention beyond their pre-established configuration, thereby positively establishing the maximum interior and exterior diameter of the resultant envelope defined by the bladder and limiting the distension of the walls thereof under these conditions to the axial direction. The pressure of such bladder will thus be momentarily raised several psi to positively maintain the bladder walls properly distended to a circular cross section as depicted in FIG. 6 thus establishing a hollow cavity 67 which is centrally located and concentric with the configuration of the mold cavity (FIG. 13) itself and the consequent tire body to be formed therein. The bladder thus serves as a mandril to form a hollow cavity in the casted tire body. In this regard, it will be appreciated that the radial column strength of the co-extensive annular flanges 56 defining the stand-off skirt 37 will tend to maintain the body of the bladder itself spaced radially to assume a concentric configuration about the drop center of the hub 25 to thereby cooperate in establishing the desired positioning of the body of such bladder. Also, the radial extent of the apexes of the respective ribs 39 (FIG. 4) will cooperate to positively space such skirt radially outwardly and maintain the open axially through passages 46 to thus allow for communication therethrough of the liquid polyurethane to form axial struts extending from one axial side to the other under the body of the bladder to cooperate in establishing nearly total encapsulation of the bladder. As will be appreciated to those skilled in the art, the bladder 35 may be maintained in spaced relationship relative to the drop center to facilitate encapsulation thereof by either the ribs 39 without the skirt 37 or by the skirt without such ribs or by the use of any other acceptable radial spacer.

It will be appreciated by those skilled in the art that the increased pressure in the bladder slightly distending the walls thereof serves to increase the volume of the cavity 67. Then as the polyurethane cures and cools over time, thus cooling the air within such chamber, there will be a slight decrease in pressure of 2–3 psi below the initial pre-pressure of about 10 psi. However, because of the relatively thick peripheral wall 47 of the body of the tire 45 and its arch shaped cross-sectional configuration, and the positive bonding to the drop center and hub, the slight decrease in pressure will not detrimentally affect the ultimate performance of the tire itself. With the relatively low pressure in the chamber 67 forming the annular cavity in the tire body, permeation of air out of the wall of the bladder 35 under normal operating conditions does not typically have serious detrimental affect on the performance of the tire, particularly given the fact that the cavity 67 is fully encapsulated by the tire body in cooperation with the drop center of the hub to thus cooperate in resisting such permeation.

Referring to FIG. 3, it will be appreciated that wheels made in accordance with the present invention may be mounted in the frame of an in-line skate utilizing roller bearing assemblies mounted on axles and received in the respective bearing glands 51 and 53. Then, when a skater wearing the skates undertakes rapid and intricate maneuvers, such as in a hockey contest, the wheels will be loaded with relatively high forces as dictated by the number of wheels mounted under a single skate and the speed at which the skates are operated and the tightness of the turns undertaken. It is important that the polyurethane body of the tire 45 is relatively soft compared to the hub, thus allowing the tread surface 47 making contact with the underlying support surface to flatten slightly thus forming a secure footprint which will cooperate in establishing high friction contact with the underlying support surface to thereby resist any tendency of the wheel to skid radially outwardly due to the centrifugal forces applied thereto during a tight turn. It will be appreciated that the reaction forces so applied to the bottom surface of the tread will act thereon to resist lateral skidding during turns at high speeds. With continued reference to FIG. 3, for the purpose of illustration, assuming the load on the tire is acted downwardly on the hub 25 to thus load the respective bead seats 55 and drop center of the hub, the forces so applied will act, in one path, radially downwardly on the opposite sides of the arch shaped tire wall to the footprint formed by the contact point of the tire with the support surface. Then, as the tire rolls along such support surface and encounters any irregularities, undulations or small obstacles, such as pebbles or gravel stones, the force of impact therewith will tend to slightly flex the wall of such tire radially inwardly toward the center of the bladder 35, which radial inward flexure will be resisted by the configuration of the relatively thick wall of such tire as incorporated in the inherently strong arch shaped structure as supported on and bonded to the bead surfaces 55 and drop center of the hub. In this manner, the performance of the wheel is relatively independent of the actual pressure in the bladder but, rather, relies on the load carrying structure afforded by the thick wall tire body and its arch shaped configuration as depicted in cross-section shown in FIG. 3. Thus, the tire itself is durable and can withstand high variation in loads and rigorous maneuvers which will serve to transfer, particularly for heavier skaters on the order of 180 to 245 pounds, the significant forces and stresses to the hub entire structure. Moreover, the relatively soft and somewhat flexible polyurethane tire body will allow for limited flexure upon contact with small obstacles and the characteristic of slight flattening at the contact surface, will provide a high friction gripping effect which will tend to resist any skidding and consequent abrasion of the tire surface and will tend to flex and accommodate abrupt changes in surface configuration.

Figures 9, 10, 11:
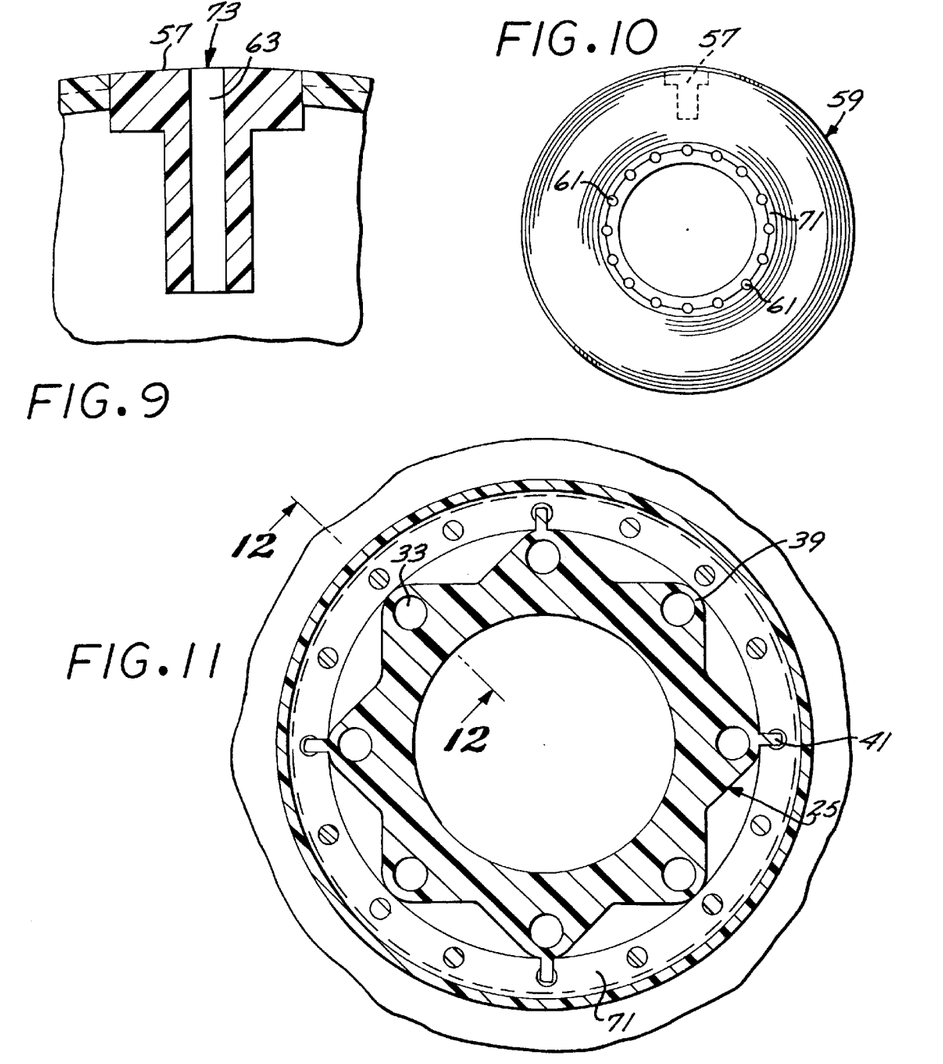
FIGS. 9 is an enlarged cross-sectional view taken along line 9—9 of FIG. 8.
FIG. 10 is a side view of a bladder device which may be incorporated in a second embodiment of the present invention.
FIG. 11 is an enlarged cross-sectional view of the bladder device shown in FIG. 10, incorporated a second embodiment of the wheel of the present invention in the skate wheel shown in FIG. 1.
Figure 12:
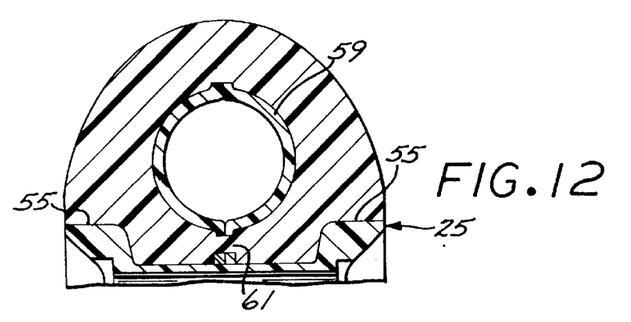
FIG. 12 is a sectional view taken along line 12—12 of FIG. 11.

Referring to the embodiment shown in FIGS. 10–12, construction thereof is similar to that described hereinabove, except that the wheel incorporates a bladder, generally designated 59, configured with an interior stand off skirt, generally designated 71, which incorporates a plurality of axially extended through communication bores 61 about 0.2 cm in diameter located in a circular array thereabout for convenient escape therethrough of any trapped air during the molding process to thereby assure full encapsulation without formation of any unwanted air bubbles.

From the foregoing, it will be appreciated that the in-line skate wheel of the present invention provides an efficient and convenient means for manufacturing a polyurethane in-line skate wheel that will provide good support and shock absorbing characteristics. The wheel will provide for uniform performance around the periphery thereof and will provide for a long and service free life without concern for deterioration thereof due to loss of air pressure or the like.

What is claimed is:

1. A polyurethane in-line skate wheel comprising:
   a hard polyurethane hub formed with an axial bore and radially outwardly facing hub wall;
   a soft polyurethane tire molded against the outwardly facing hub wall, bonded thereto and configured to define an arch shaped cushion having a rounded in transverse cross section radially outer peripheral tread wall;
   an annular polyurethane bladder molded in said tire body, about such hub wall, concentric about said axial bore to provide a cavity and having a radially interior annular stand off skirt projecting radially inwardly to contact said hub and cooperate in supporting said bladder during molding of said body; and
   said hub including radial centering fins constructed to maintain said bladder axially centered relative to said hub wall.

2. A polyurethane in-line skate wheel as set forth in claim 1 wherein:
   said centering fins are configured to directly contact said skirt to cooperate in maintaining said bladder axially centered.

3. A polyurethane in-line skate wheel as set forth in claim 1 wherein:
   said bladder is formed with a toroidal chamber pressurized with air.

4. A polyurethane in-line skate wheel as set forth in claim 1 wherein:
   said bladder includes a pair of ring shaped polyurethane sheets defining side walls and radially internal and radially external heat sealed weld seams sealing the marginal edges of such sheets together.

5. A polyurethane in-line skate wheel as set forth in claim 1 wherein:
   said bladder is constructed with a bladder chamber and includes a valve operable during manufacture for introduction of fluid.

6. A polyurethane in-line skate wheel as set forth in claim 1 wherein:

said bladder is constructed with a pressurization chamber including fluid selected from a group of air, helium, CFC gases, carbon dioxide and neon.

7. A polyurethane in-line skate wheel as set forth in claim 1 wherein:

said bladder is formed with a radially interior non-distendable ring defining said stand off skirt.

8. A polyurethane in-line skate wheel as set forth in claim 1 wherein:

said bladder is formed with a radially exterior non-distendable ring.

9. A polyurethane in-line skate wheel as set forth in claim 1 wherein:

said hub is formed with radially projecting ribs contacting said bladder and cooperating therewith to form between said radially outwardly facing hub wall and said bladder axial bridge spaces; and said tire includes polyurethane bridge segments in said bridge spaces.

10. An in-line skate wheel as set forth in claim 1 wherein:

said bladder is formed with flexible bladder walls defining a toroidal gas chamber and includes a positive coefficient of thermal expansion compressible gas pressurized to a low pressure so that during manufacture it may be heated to a selected elevated temperature to expand said gas to positively distend said bladder walls.

11. An in-line skate wheel comprising:

a hard hub formed with a central axial bore;

a urethane bladder device disposed in concentric spaced relationship about said bore and formed with a radially interior annular skirt;

said hub including radial rib elements spaced annularly about said bore and projecting radially to form respective radially outwardly facing contact surfaces contacting said bladder device to maintain it in said spaced relationship, at least some of said rib elements including fins configured to form radially outwardly opening grooves receiving said skirt to maintain the axial spacing of said skirt on said hub; and a urethane tire body formed over said bladder and bonded to said hub.

12. An in-line skate wheel as set forth in claim 11 wherein:

said bladder device is formed with a chamber pressurized with fluid.

13. An in-line skate wheel as set forth in claim 11 wherein:

said skirt is formed with axial holes spaced annularly therearound.

14. An in-line skate wheel as set forth in claim 13 wherein:

said rib elements are configured to be annularly spaced apart and so arranged on the hub as to form bridge spaces radially interior of said bladder device during manufacture of said wheel; and said tire includes axial bridge segments in said bridge spaces.

15. An in-line skate wheel as set forth in claim 14 wherein:

said rib elements are configured to hold said bladder spaced from said hub a distance sufficient to cause said bridge space to, in at least some annular locations, project axially through on the inner radial side of said bladder skirt.

16. An in-line skate wheel as set forth in claim 15 wherein:

said tire body is constructed by cast molding.

17. An in-line skate wheel as set forth in claim 11 wherein:

said bladder is formed with flexible bladder walls defining a toroidal gas chamber and includes a positive coefficient of thermal expansion compressible gas pressurized to a low pressure so that during manufacture heating to a selected elevated temperature will expand said gas to positively distend said bladder walls.

18. An in-line skate wheel as set forth in claim 11 wherein:

said tire body is constructed by cast molding.

* * * * *